(12) United States Patent
Maurel

(10) Patent No.: US 11,828,352 B1
(45) Date of Patent: Nov. 28, 2023

(54) TRANSMISSION MECHANISM AND ASSOCIATED PROPULSION UNIT

(71) Applicant: VALEO EMBRAYAGES, Amiens (FR)

(72) Inventor: Herve Maurel, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 17/933,630

(22) Filed: Sep. 20, 2022

(30) Foreign Application Priority Data

Sep. 20, 2021 (FR) ...................................... 2109876

(51) Int. Cl.
| | |
|---|---|
| *F16H 37/08* | (2006.01) |
| *F16H 3/46* | (2006.01) |
| *B60K 17/08* | (2006.01) |
| *B60K 1/00* | (2006.01) |

(52) U.S. Cl.
CPC ............ *F16H 37/082* (2013.01); *B60K 1/00* (2013.01); *B60K 17/08* (2013.01); *F16H 3/46* (2013.01); *B60K 2001/001* (2013.01); *F16H 2200/0021* (2013.01); *F16H 2200/0034* (2013.01);
(Continued)

(58) Field of Classification Search
CPC .. F16H 37/082; F16H 3/46; F16H 2200/0021; F16H 2200/0034; F16H 2200/2005; F16H 2200/2035; B60K 1/00; B60K 2001/001; B60K 17/08
See application file for complete search history.

(56) References Cited

U.S. PATENT DOCUMENTS

| | | |
|---|---|---|
| 7,185,722 B1 | 3/2007 | Sakamoto et al. |
| 9,453,564 B1 | 9/2016 | Pritchard et al. |
| 9,637,127 B1 * | 5/2017 | Cooper ................ B60W 10/115 |

(Continued)

FOREIGN PATENT DOCUMENTS

| | | |
|---|---|---|
| DE | 10 2014 223502 A1 | 5/2016 |
| EP | 1 122 110 A2 | 8/2001 |

(Continued)

OTHER PUBLICATIONS

French Preliminary Search Report dated Apr. 19, 2022 in French Application 21 09876, filed on Sep. 20, 2021 (with English Translation of Categories of cited documents and Written Opinion), 10 pages.

*Primary Examiner* — Huan Le
(74) *Attorney, Agent, or Firm* — Oblon, McClelland, Maier & Neustadt, L.L.P.

(57) ABSTRACT

A transmission mechanism includes an input reduction stage having an input member and an output member rotating about axes that are parallel to a reference axis of the mechanism, an output differential, two output half-shafts which are driven by the differential, at least a first planetary geartrain kinematically connecting the input reduction stage to the output differential. A switchover mechanism switches the first planetary geartrain between at least a first speed ratio and a second speed ratio. The first planetary geartrain and the output member of the input reduction stage are coaxial with the reference axis and with one reference half-shaft of the output half-shafts and surround the reference half-shaft, the first planetary geartrain being positioned, along the reference axis, between the output member of the input reduction stage and the output differential.

17 Claims, 2 Drawing Sheets

(52) U.S. Cl.
CPC ........... *F16H 2200/2005* (2013.01); *F16H 2200/2007* (2013.01); *F16H 2200/2035* (2013.01)

(56) References Cited

U.S. PATENT DOCUMENTS

| | | | |
|---|---|---|---|
| 11,002,350 B2* | 5/2021 | Waltz | B60K 17/08 |
| 11,273,701 B2* | 3/2022 | Devreese | B60K 1/00 |
| 2001/0042647 A1 | 11/2001 | Sakamoto et al. | |
| 2017/0175863 A1 | 6/2017 | Kramer et al. | |
| 2019/0366822 A1 | 12/2019 | Yu et al. | |
| 2021/0254687 A1 | 8/2021 | Li et al. | |

FOREIGN PATENT DOCUMENTS

| | | |
|---|---|---|
| EP | 3 546 262 A1 | 10/2019 |
| EP | 3 812 617 A1 | 4/2021 |
| WO | WO 2015/149874 A1 | 10/2015 |

* cited by examiner

TRANSMISSION MECHANISM AND ASSOCIATED PROPULSION UNIT

TECHNICAL FIELD OF THE INVENTION

The invention relates to a transmission mechanism more particularly intended to drive a vehicle wheelset, and to a propulsion unit including such a transmission mechanism.

PRIOR ART

Document US2019017573 describes a kinematic transmission mechanism placed between an electric motor and the wheels of a vehicle, the transmission mechanism comprising an input reduction stage having an input pinion mounted on the drive-shaft and an output pinion secured to, in order to rotate as one with, the ring gear of a type-I plantetary geartrain. The planet carrier of the plantetary geartrain is secured to, in order to rotate as one with, an input pinion of an output reduction gearing of which the output pinion is secured to an input element of a differential driving two output half-shafts which are parallel to the reference direction. The plantetary geartrain can be switched between two speed ratios using a brake and a clutch. The axes of rotation of the pinions of the reduction gearings and of the rotary members of the plantetary geartrain are all parallel to the one same reference direction, which is itself parallel to one of the output half-shafts of the differential. However, the axis of rotation of the output pinion of the input reduction gearing is distant from the main axis of rotation of the plantetary geartrain, which is itself distant from the axis of rotation of the output pinion of the output reduction gearing. These arrangements mean that the transmission and the associated propulsion unit are very bulky.

SUMMARY OF THE INVENTION

The invention seeks to overcome the disadvantages of the prior art and to offer a more compact multiple-ratio transmission mechanism and associated electric propulsion unit.

In order to achieve this, a first aspect of the invention proposes a transmission mechanism comprising: an input reduction stage having an input member and an output member rotating about axes that are parallel to a reference axis of the mechanism, an output differential, two output half-shafts which are driven by the output differential, at least a first plantetary geartrain kinematically connecting the input reduction stage to the output differential, and a switchover mechanism for switching the first plantetary geartrain between at least a first speed ratio and a second speed ratio. The first plantetary geartrain and the output member of the input reduction stage are coaxial with the reference axis and with one reference half-shaft of the output half-shafts and surround the reference half-shaft, the first plantetary geartrain being positioned, along the reference axis, between the output member of the input reduction stage and the output differential.

This layout provides a saving on space while at the same time maintaining some freedom in the positioning of the input member of the reduction stage, of which the distance to the reference half-shaft can be adapted, as need be, to suit the dimensions of the electric machine that drives it.

According to one particularly advantageous embodiment, the input member of the input reduction stage has an interface allowing it to be secured to, in order to rotate as one with, a drive-shaft parallel to the reference axis and placed axially on the same side of the input member as the first plantetary geartrain. The drive-shaft for example constitutes an output shaft of an electric machine, and the electric machine may be positioned so that it is partially or completely superposed with the first planetary geartrain and/or the output differential.

According to one embodiment, the switchover mechanism comprises at least a brake and at least a clutch. As a preference, the switchover mechanism comprises a brake and a clutch only, in order to achieve two, and only two, transmission ratios. Such a device makes it possible to create two transmission ratios according to whether the brake or the clutch is engaged.

The switchover mechanism may comprise an interlock such that the brake and the clutch cannot both be in the engaged state simultaneously. Alternatively, provision may be made for the switchover mechanism to allow the brake and the clutch to be engaged simultaneously when the vehicle is stationary, in order to provide a parking brake.

It is equally possible to provide an interlock such that the brake and the clutch cannot both be in the disengaged state simultaneously, in order to ensure that there is always, by default, a transmission ratio. Alternatively, provision may be made for the switchover mechanism to allow the brake and the clutch to be disengaged simultaneously, in order to achieve uncoupling between the input reduction stage and the output differential. An uncoupling function may alternatively be incorporated into the output differential.

According to one embodiment, the brake and the clutch of the normally-open type, so that in the event of failure of the switchover mechanism or of its control apparatus, the input reduction stage is uncoupled from the output differential. According to an alternative embodiment, one of the two members of the switching mechanism, namely either the brake or the clutch, is normally open and the other is normally closed, so that in a downgraded mode in the event of failure of the switchover mechanism or of its control apparatus, one of the speed ratios is engaged. Finally, according to another alternative embodiment, provision is made for the brake and the clutch to be both normally closed, making it possible to provide a parking-brake function by simultaneous application of the brake and of the clutch, without the input of energy. In such a scenario, it may be advantageous to provide, downstream of the first planetary geartrain, a normally-open clutch that allows the output differential to be uncoupled in the event of failure of the switchover mechanism or of its control apparatus.

The planetary geartrain comprises three main rotary members, namely an internal or external planetary geartrain main gear (namely either a sun gear or a ring gear), a planet carrier, having a single array of single-toothset or double-toothset planet pinions, or two arrays of planet pinions, and a second internal or external planetary geartrain main gear (again either a sun gear or a ring gear). One of these rotary members is an input rotary member secured to the output member of the input reduction stage, another is an output rotary member kinematically connected, preferably permanently, to the output differential, and the third is an intermediate member. According to one embodiment, the intermediate rotary member is associated with the brake that allows the rotation of the intermediate rotary member to be locked in order to achieve the first speed ratio, and with the clutch that allows the intermediate rotary member to be coupled to the input rotary member or to the output rotary member in order to achieve the second speed ratio.

According to one embodiment, the intermediate rotary member is a planet carrier. Alternatively, the intermediate rotary member is a planetary geartrain main gear, consisting, for example, of a sun gear or a ring gear. In this configuration, the planetary geartrain has just one set of planet pinions. It is not, for example, a double planetary geartrain such as a Ravigneaux geartrain.

According to one embodiment, the output rotary member is permanently kinematically connected to the output differential. The transmission mechanism thus has a simple design between the first planetary geartrain and the output differential.

According to one embodiment, the input rotary member is a planetary geartrain ring gear. According to another embodiment, that offers the advantage of a lower moment of inertia at the input of the first planetary geartrain, the input rotary member is a planetary geartrain sun gear.

It is advantageous for the brake and the clutch to be situated close to one another so that the switchover mechanism forms a structural entity of the transmission mechanism. According to one embodiment, the brake and the clutch are axially positioned, with respect to the reference axis, on the one same side of the first planetary geartrain, preferably on the one same side of the output member of the input reduction stage, for example between the output member of the input reduction stage and the first planetary geartrain or, for preference, on a side of the input reduction gearing opposite to the first planetary geartrain and to the output differential, thereby making it easier to access the switchover mechanism and easier to integrate the supplies (of fluid or of electricity) and the switchover mechanism actuating elements.

According to one embodiment, the brake and the clutch are positioned axially on the one same side of the output member of the input reduction stage. In particular, the gear wheels and pinions of the input reduction stage are positioned axially between the switchover mechanism and the first planetary geartrain. Thus, the switchover mechanism may form a module distinct from the reduction unit made from the input reduction stage and from the first planetary geartrain, and from the differential and, where applicable, from the second planetary geartrain. The switchover mechanism may for example be situated axially at one end of the transmission mechanism. It is thus easier to integrate the supplies (of fluid or of electricity) and the switchover mechanism actuating elements.

As a preference, the output member of the first planetary geartrain is connected to the brake and to the clutch only via the intermediate member and/or via the input member of the first planetary geartrain. Thus, because the output member of the first planetary geartrain is not connected to the switchover mechanism directly, it is easier for the latter to be positioned on the one same side of the first planetary geartrain that is the opposite side to the output differential or, for preference, on the one same side of the input reduction gearing that is the opposite side to the first planetary geartrain and to the output differential.

As a preference, the output member of the first planetary geartrain is connected to the brake and to the clutch only via the intermediate member and/or via the input member of the first planetary geartrain.

As a preference, the switchover mechanism forms a structural entity of the transmission mechanism.

In particular, the transmission mechanism has just two transmission ratios.

The first speed ratio and the second speed ratio preferably have the same sign, positive or negative, which is to say either without or with a reversal of the direction of rotation between the input member and output member of the planetary geartrain. According to a preferred embodiment, the first speed ratio and the second speed ratio are in a ratio one with the other of between 1.5 and 2, making it possible to broaden the range of speeds of the output member of the first planetary geartrain while at the same time maintaining some overlap between the speed ranges accessible with each ratio, in order to provide smoothness in gear changes.

According to one embodiment of the invention, the transmission mechanism comprises a second planetary geartrain placed in series with the first planetary geartrain and coaxial with the first planetary geartrain, preferably that cannot be switched over, preferably between the first planetary geartrain and the differential. This second planetary geartrain constitutes an output reduction gearing downstream of the first planetary geartrain, which may, for example, have a ratio greater than 2:1 and less than 4:1, preferably a ratio of 3:1. According to one embodiment, the second planetary geartrain is of the first type with a fixed ring gear.

According to one embodiment, the second planetary geartrain is positioned axially between the first planetary geartrain and the differential.

According to one embodiment, the transmission mechanism comprises at least a guide bearing guiding the rotation of an input member of the differential about the reference axis, at least a guide bearing guiding the rotation of the reference half-shaft about the reference axis, and/or at least a guide bearing guiding the rotation of the output member of the input reduction stage about the reference axis. It is notably possible to envision two guide bearings guiding the input member of the output differential, and positioned for example axially one on each side of a centre of the output differential. The guide bearing guiding the rotation of the reference half-shaft is preferably positioned in such a way that the first planetary geartrain is situated axially between the guide bearing guiding the rotation of the reference half-shaft and the guide bearing or bearings guiding the input member of the output differential.

Another aspect of the invention relates to a propulsion unit comprising: a rotary electric machine and a transmission mechanism as described hereinabove, the electric machine being parallel to the reference axis of the transmission mechanism and positioned axially on the same side of the input member as the planetary geartrain.

Advantageously, the components of this propulsion unit can be positioned in such a way that, in projection onto a reference plane containing the reference axis, the electric machine fully or partially overlaps with the first planetary geartrain and/or with the output differential.

Another aspect of the invention relates to a motor vehicle drivetrain comprising a propulsion unit as described hereinabove and two driven wheels driven by two output half-shafts driven by the output differential.

BRIEF DESCRIPTION OF THE FIGURES

Further features and advantages of the invention will become apparent from reading the following description, with reference to the appended figures.

For greater clarity, identical or similar elements are identified using identical reference signs in all of the figures.

DETAILED DESCRIPTION OF EMBODIMENTS

Figure 1:
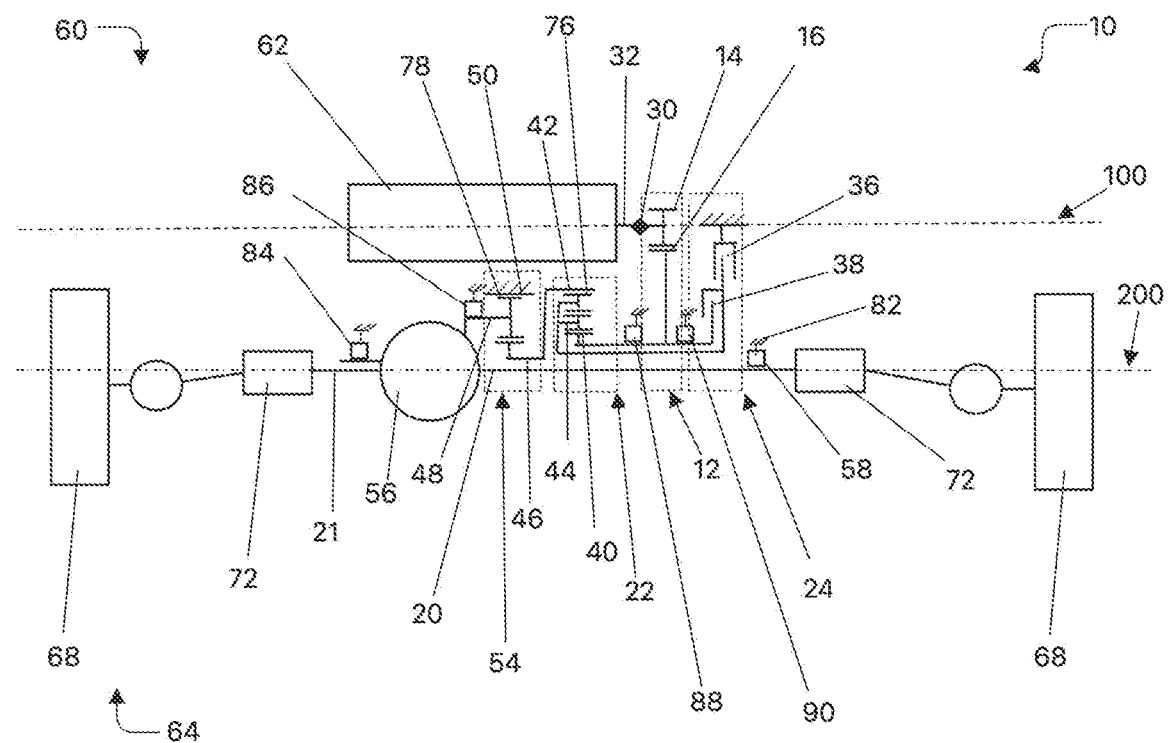
FIG. 1 illustrates a motor vehicle drivetrain comprising a propulsion unit and a transmission mechanism according to a first embodiment of the invention.

FIG. 1 illustrates a motor vehicle drivetrain 64 intended more particularly, although not exclusively, for a highperformance privately-operated vehicle, having at least two driven wheels 68, right and left, driven by a propulsion unit 60.

This propulsion unit 60 comprises an electric machine 62 and a transmission mechanism 10 kinematically connecting the electric machine 62 to the vehicle wheels 68.

The electric machine 62 is, where applicable, reversible, able to generate on its drive-shaft 32 a drive torque for driving the wheels 68 and, where applicable, a resistive torque for slowing them.

Given that the electric machine 62 is intended to rotate more quickly than the vehicle wheels 68 in most of the operating conditions encountered, the transmission mechanism 10 has a speed-reducing function. Furthermore, in order to give the vehicle good performance in terms of speed and in terms of torque, while at the same time allowing the electric machine 62 to operate in a favourable speed and torque operating range, the transmission mechanism 10 is intended to make it possible to establish at least two different speed ratios between the drive-shaft 32 of the electric machine 62 and the vehicle wheels 68. In practice, two ratios are sufficient for good performance, so long as the ratio between the two speed ratios is comprised between 1.5 and 2.

To this end, the transmission mechanism 10 comprises an input reduction stage 12 driven directly by the drive-shaft 32 of the electric machine 62, a switchable first planetary geartrain 22 at the output of the input reduction stage 12, a second planetary geartrain 54 with a speed-reducing function and driven by the first planetary geartrain 22, a differential 56 driven by the second planetary geartrain 54, and two half-shafts 20, 21 which are secured to, in order to rotate as one with, the output members of the differential 56 and are intended to drive two driven wheels 68 of the vehicle, via transmission joints 72.

The input reduction stage 12 may be of any type having an input member 14 and an output member 16 rotating about parallel axes 100, 200. It may be a reduction stage 12 with or without a reversal in direction, for example using meshing gear sets, belt or chain. By way of indication, the reduction ratio of the input reduction stage 12 may be of the order of 2:1 to 4:1, for example 3:1.

The switchable first planetary geartrain 22 is, in the embodiment of FIG. 1, a geartrain of which the input rotary member 40 secured to, in order to rotate as one with, the output member 16 of the input reduction gearing 12, is a planetary geartrain main gear, in this instance more specifically a planetary geartrain sun gear, the output rotary member 42 is a planetary geartrain main gear, here consisting of a ring gear, and the intermediate rotary member 44, coaxial with the input rotary member 40 and output rotary member 42, is a planet carrier with two arrays of planet pinions 76 meshing with one another, one array meshing with the input rotary member 40 and the other with the output rotary member 42.

A switchover mechanism 24 makes it possible to generate two ratios, namely a first ratio in which the intermediate rotary member 44 is immobilized by a brake 36 to achieve a ratio preferably higher than 3:2 and lower than 2:1, for example a ratio of 1.85, and a second ratio in which the intermediate rotary member 44 is secured to the input rotary member 40 by a clutch 38 to achieve a 1:1 ratio. The brake 36 and the clutch 38 are preferably progressive in order to ensure continuous transitions in the changes in gear ratio.

The output rotary member 42 of the first planetary geartrain 22 is secured to the input rotary remember 46 of the second planetary geartrain 54, which in this instance is a sun gear. The output rotary member 48 of the second planetary geartrain 54, secured to the input member of the differential 56, is a planet carrier of which the planet pinions 78 mesh with the input rotary member 46 and with a fixed intermediate ring gear that constitutes the intermediate member 50 of the second planetary geartrain 54. By way of indication, the reduction ratio of the second planetary geartrain may be of the order of 2:1 to 4:1, for example 3:1.

The second planetary geartrain 54 is optional and, in instances in which it is omitted, the output rotary member 42 of the first planetary geartrain 22 may be secured to the input member of the differential 56.

According to the invention, the first planetary geartrain 22 and the output member 16 of the input reduction stage 12 are coaxial with one of the output half-shafts 20, 21 of the differential 56, referred to hereinafter as the reference half-shaft 20, and surround the reference half-shaft 20, the first planetary geartrain 22 being positioned, along the axis of rotation 200, referred to hereinafter as the reference axis, between the output member 16 of the input reduction stage 12 and the output differential 56. If the second planetary geartrain 54 is present, it too is coaxial with the reference half-shaft 20 and situated between the first planetary geartrain 22 and the differential 56.

FIG. 1 depicts a guide bearing 58 guiding the rotation of the reference half-shaft 20 with respect to the vehicle chassis 82, about a geometric reference axis of the drivetrain, which is the axis of revolution 200 of the reference half-shaft 20 and which is a transverse axis of the vehicle in which the drivetrain 64 is mounted. Also illustrated are two guide bearings 84, 86 guiding the input member of the differential 56 with respect to the chassis 82 of the vehicle, these two bearings being situated for example one on each side of the differential 56, along the reference axis 200. The guide bearing 58 guiding the rotation of the reference half-shaft 20 is preferably positioned in such a way that the first planetary geartrain 22 is situated axially between the guide bearing 58 guiding the rotation of the reference half-shaft and the guide bearing or bearings 84, 86 guiding the input member of the output differential 56. Two bearings 88, 90, distant from one another along the reference axis 200 are also provided for guiding the rotation of the output member 16 of the input reduction stage 12 and the input rotary member 40 of the first planetary geartrain 22 and these bearings are preferably situated axially one on each side of this output member 16 with respect to the reference axis 200.

The drive-shaft 32 of the electric machine 62 is coaxial with the axis of rotation 100 of the input member 14 of the reduction stage 12, parallel to the reference half-shaft 20, distant from the reference half-shaft 20, and positioned axially on the same side of the input member 14 of the input reduction stage 12 as the first planetary geartrain 22. The drive-shaft 32 is secured to, in order to rotate as one with, the input member 14 of the input reduction stage 12 via an interface 30.

In projection onto a reference plane containing the reference axis 200, the electric machine 62 fully or partially overlaps with the first planetary geartrain 22 and/or the output differential 56.

Figure 2:
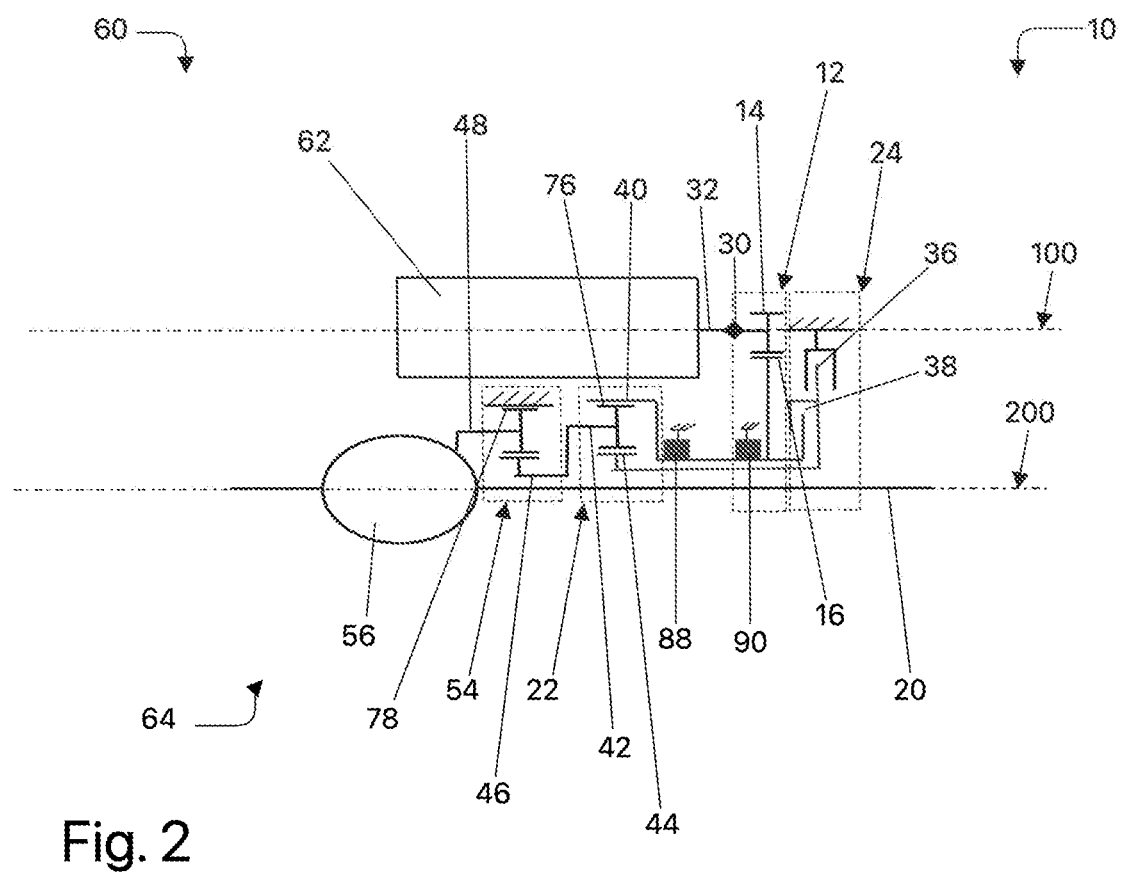
FIG. 2 illustrates part of a motor vehicle drivetrain comprising a propulsion unit and a transmission mechanism according to a first embodiment of the invention.

The motor vehicle drivetrain 64 illustrated in FIG. 2 differs from that of FIG. 1 in terms of the first planetary geartrain 22, of which the input rotary member 40 is a planetary geartrain ring gear, the intermediate rotary member 44 is a planetary geartrain sun gear and the output rotary member 42 is a planet carrier having one array of planet pinions 76 which mesh with the planetary geartrain sun gear 44 and the planetary geartrain ring gear 40.

The switchover mechanism, in this embodiment, comprises a clutch 38 for securing the intermediate rotary member to the input rotary member 40 and achieving a transmission ratio of 1:1, and a brake 36 for immobilizing the intermediate rotary member 44 in terms of rotational movement and generating a reduction ratio here comprised, for example, between 3:2 and 2:1. As in the first embodiment, the axes of rotation 200 of one of the output half-shafts 20, 21 of the differential 56, referred to as the reference half-shaft 20, of the first planetary geartrain 22 and of the output member 16 of the input reduction stage 12 are coaxial and are parallel to the axis of rotation 100 of the drive-shaft 32 and of the input member 14 of the input reduction stage 12. The rotational guidance of the output member 16 of the input reduction stage 12 and of the input rotary member 40 on the first planetary geartrain 22 with respect to the vehicle chassis 82 (or with respect to a housing of the propulsion unit) is preferably provided by two bearings 88, 90 that are axially distant from one another, which have been illustrated here axially on the one same side of the output member 16 of the input reduction stage 12, namely between the output member 16 of the input reduction stage 12 and the first planetary geartrain 22.

In both of the two embodiments, an output member 16 of an input reduction stage 12, a switchable first planetary geartrain 22 and, where applicable, a second, preferably non-switchable, planetary geartrain 54 are arranged in a compact manner coaxially around an axis of rotation of an output half-shaft 20 of an output differential 56 of the transmission mechanism 10, around the output half-shaft 20. It is furthermore possible to position the electric machine 62 that drives this transmission mechanism parallel to the axis of rotation of the half-shaft 20, at some distance therefrom, and partially or fully superposed with the switchable planetary geartrain 22 and, where applicable, the second planetary geartrain 54 and/or the output differential 56.

Provision may be made for the switchable first planetary geartrain 22 to be provided with a parking brake function by applying the brake 36 and the clutch 38 together. This arrangement offers the advantage of significantly stepping down the torque, but does require the brake 36 and the clutch 38 to be of the normally-closed type, something which is not always desirable. Alternatively, it is also possible to provide a dedicated parking brake, which may be sited for example at the input member of the differential 56 or at the output member of the switchable first planetary geartrain 22. This solution offers the advantage of allowing the brake 36 and the clutch 38 to be of the normally-open type or of allowing one of them to be of the normally-open type and the other to be of the normally-closed type.

In both of the embodiments, the brake 36 and the clutch 38 of the switchover mechanism 24 are situated in the one same region, in this instance on the side of the output member 16 of the input reduction stage 12 opposite to the first planetary geartrain 22. Other positionings are possible, for example between the output member 16 of the input reduction stage 12 and the first planetary geartrain 22.

The invention claimed is:

1. Transmission mechanism comprising:
   an input reduction stage having an input member and an output member, the input member rotating about an axis that is parallel to a reference axis of the transmission mechanism, and the output member rotating about an other axis which is parallel to the axis of the input member,
   an output differential,
   two output half-shafts which are driven by the output differential,
   at least a first plantetary geartrain kinematically connecting the input reduction stage to the output differential, and
   a switchover mechanism for switching the first plantetary geartrain between at least a first speed ratio and a second speed ratio,
   wherein the first plantetary geartrain and the output member of the input reduction stage are coaxial with the reference axis of the transmission mechanism and with one reference half-shaft of the output half-shafts and surround the reference half-shaft, the first plantetary geartrain being positioned, along the reference axis, between the output member of the input reduction stage and the output differential,
   wherein the switchover mechanism comprises at least a brake and at least a clutch,
   wherein the brake and the clutch are positioned axially on the one same side of the output member of the input reduction stage, and
   wherein the brake and the clutch are axially positioned, with respect to the reference axis, on a side of the input reduction gearing opposite to the first planetary geartrain and to the output differential.

2. Transmission mechanism according to claim 1, wherein the input member of the input reduction stage has an interface allowing it to be secured to, in order to rotate as one with, a drive-shaft parallel to the reference axis and placed axially on the same side of the input member as the first plantetary geartrain.

3. Transmission mechanism according to claim 1, wherein the switchover mechanism comprises a brake and a clutch only.

4. Transmission mechanism according to claim 1, wherein the first plantetary geartrain comprises three coaxial rotary members, namely an input rotary member secured to the output member of the input reduction stage, an output rotary member kinematically connected to the output differential, and an intermediate rotary member, the intermediate rotary member being associated with the brake that allows the rotation of the intermediate rotary member to be locked in order to achieve the first speed ratio, and with the clutch that allows the intermediate rotary member to be coupled to the input rotary member or to the output rotary member in order to achieve the second speed ratio.

5. Transmission mechanism according to claim 4, wherein the intermediate rotary member is a planet carrier.

6. Transmission mechanism according to claim 4, wherein the intermediate rotary member is a planetary geartrain main gear, consisting of a sun gear or ring gear.

7. Transmission mechanism according to claim 4, wherein the output rotary member is permanently kinematically connected to the output differential.

8. Transmission mechanism according to claim 1, wherein the brake and the clutch are positioned axially on the one same side of the first planetary geartrain.

9. Transmission mechanism according to claim 1, wherein the switchover mechanism forms a structural entity of the transmission mechanism.

10. Transmission mechanism according to claim 1, wherein the transmission mechanism has just two transmission ratios.

11. Transmission mechanism according to claim 1, wherein the first speed ratio and the second speed ratio are in a ratio one with the other of between 1.5 and 2.

12. Transmission mechanism according to claim 1, wherein it comprises a second planetary geartrain placed in series with the first planetary geartrain and coaxial with the first planetary geartrain.

13. Transmission mechanism according to claim 12, wherein the second planetary geartrain cannot be switched over.

14. Transmission mechanism according to claim 12, wherein the second planetary geartrain is positioned axially between the first planetary geartrain and the differential.

15. Transmission mechanism according to claim 1, wherein it comprises at least a guide bearing guiding the rotation of an input member of the differential about the reference axis, at least a guide bearing guiding the rotation of the reference half-shaft about the reference axis, and at least a guide bearing guiding the rotation of the output member of the input reduction stage about the reference axis; the guide bearing guiding the rotation of the reference half-shaft being positioned in such a way that the first planetary geartrain is situated axially between the guide bearing guiding the rotation of the reference half-shaft and the guide bearing or bearings guiding the input member of the output differential.

16. Propulsion unit comprising: a rotary electric machine and a transmission mechanism according to claim 1, the rotary electric machine being parallel to the reference axis of the transmission mechanism and positioned axially on the same side of the input member as the first planetary geartrain.

17. Propulsion unit according to claim 16, wherein, in projection onto a reference plane containing the reference axis, the electric machine fully or partially overlaps with the first planetary geartrain and the output differential.

* * * * *